(12) United States Patent
Matsuda (10) Patent No.: US 9,367,768 B2
(45) Date of Patent: Jun. 14, 2016

(54) IMAGE PROCESSING DEVICE, IMAGE PROCESSING METHOD, AND STORAGE MEDIUM COMPUTER-READABLY STORING PROGRAM THEREFOR

(71) Applicant: CANON KABUSHIKI KAISHA, Tokyo (JP)

(72) Inventor: Araki Matsuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/732,050

(22) Filed: Jun. 5, 2015

(65) Prior Publication Data

US 2015/0356377 A1 Dec. 10, 2015

(30) Foreign Application Priority Data

Jun. 9, 2014 (JP) ................................. 2014-118739

(51) Int. Cl.
*G06K 9/46* (2006.01)
*G06K 9/62* (2006.01)

(52) U.S. Cl.
CPC ............... *G06K 9/6267* (2013.01); *G06K 9/46* (2013.01); *G06K 9/6215* (2013.01)

(58) Field of Classification Search
CPC ............ G06F 17/30386; G06F 17/30705; G06F 17/30256; G06F 17/30811; G06F 17/30259; Y10S 707/99933; Y10S 707/99945; C12Q 2600/158; G06K 9/00221; G06K 9/00624; G06K 9/00288; G06K 9/6218; G06K 9/3241; G06K 9/6202; G06K 9/00; G06K 9/6256; A63F 2300/203; A63F 2300/65; G06T 7/0028; G06T 7/0085; G06T 7/2033; H04N 5/145; A61B 6/5247; A61B 8/5238
USPC ......... 382/103, 118, 124, 190, 220; 345/440, 345/619
See application file for complete search history.

(56) References Cited

U.S. PATENT DOCUMENTS

| | | | | |
|---|---|---|---|---|
| 2005/0117803 A1* | 6/2005 | Ikeda | ................. | G06K 9/00449 382/190 |
| 2006/0122965 A1* | 6/2006 | Adams | .............. | G06F 17/30386 |
| 2007/0216709 A1* | 9/2007 | Kojima | ................. | G06F 3/1415 345/619 |
| 2008/0056545 A1* | 3/2008 | Kamasuka | ........... | G06K 9/6202 382/124 |
| 2009/0196467 A1* | 8/2009 | Okubo | ................. | G06K 9/6228 382/118 |
| 2009/0324014 A1* | 12/2009 | Kato | ................. | G06F 17/30811 382/103 |

(Continued)

FOREIGN PATENT DOCUMENTS

JP 2010-86549 A 4/2010

*Primary Examiner* — Nirav G Patel
*Assistant Examiner* — Aklilu Woldemariam
(74) *Attorney, Agent, or Firm* — Canon U.S.A., Inc. IP Division (57) ABSTRACT

An image processing process includes classifying an Object-related information indicating a feature of an object into an attribute, generating feature information of a partial area of an image, calculating a degree of similarity between the object and the partial area based on the object-related information and the feature information, estimating, based on the degree of similarity, the object for each of the partial areas, calculating, for a combination of the estimated objects, a total of the degrees of similarity between the object classified into the attribute and the partial area for each of the attributes, selecting, based on the total, at least one of the combinations of the estimated objects, and storing the object included in the selected combination in association with the image.

9 Claims, 8 Drawing Sheets

(56) References Cited

U.S. PATENT DOCUMENTS

2011/0231399 A1* 9/2011 Zhang .................. G06K 9/6222
707/737
2012/0294496 A1* 11/2012 Nakamoto ......... G06K 9/00288
382/118
2013/0286217 A1* 10/2013 Tsuji .................. G06K 9/00221
348/169
2015/0071529 A1* 3/2015 Yokoi .................. G06K 9/6256
382/159
2015/0199571 A1* 7/2015 Okuyama .......... G06K 9/00221
382/103

* cited by examiner

| PERSONAL ID | NAME | ATTRIBUTE | FACE FEATURE INFORMATION |
|---|---|---|---|
| ID_001 | ⋯ | FRIEND | ⋯ |
| ID_002 | ⋯ | FRIEND | ⋯ |
| ID_003 | ⋯ | FRIEND | ⋯ |
| ID_004 | ⋯ | FRIEND | ⋯ |
| ID_005 | ⋯ | FAMILY | ⋯ |
| ID_006 | ⋯ | FAMILY | ⋯ |
| ID_007 | ⋯ | COLLEAGUE | ⋯ |
| ID_008 | ⋯ | COLLEAGUE | ⋯ |
| ID_009 | ⋯ | COLLEAGUE | ⋯ |
| ID_010 | ⋯ | COLLEAGUE | ⋯ |

| PERSONAL ID | SCORE |
|---|---|
| ID_001 | 0.80 |
| ID_002 | 0.52 |
| ID_003 | 0.43 |
| ID_004 | 0.54 |
| ID_005 | 0.60 |
| ID_006 | 0.41 |
| ID_007 | 0.24 |
| ID_008 | 0.36 |
| ID_009 | 0.22 |
| ID_010 | 0.48 |

| COMBINATION OF PERSONS | FRIEND ATTRIBUTE SCORE TOTAL | FAMILY ATTRIBUTE SCORE TOTAL | COLLEAGUE ATTRIBUTE SCORE TOTAL |
|---|---|---|---|
| ID_001, ID_002, ID_003, ID_004 | 2.9 | 0 | 0 |
| ID_001, ID_002, ID_003, ID_010 | 2.2 | 0 | 0.8 |
| ID_001, ID_002, ID_006, ID_004 | 2.1 | 0.7 | 0 |
| ... | ... | ... | ... |

| COMBINATION OF PERSONS | FRIEND ATTRIBUTE SCORE TOTAL | FAMILY ATTRIBUTE SCORE TOTAL | COLLEAGUE ATTRIBUTE SCORE TOTAL | FRIEND OR FAMILY ATTRIBUTE SCORE TOTAL |
|---|---|---|---|---|
| ID_001, ID_002, ID_003, ID_005 | – | – | 0 | 3.2 |
| ID_001, ID_002, ID_006, ID_005 | – | – | 0 | 3.25 |
| ID_001, ID_002, ID_009, ID_005 | – | – | 0.8 | 2.5 |
| ... | ... | ... | ... | ... |

ID, IMAGE PROCESSING DEVICE, IMAGE
PROCESSING METHOD, AND STORAGE
MEDIUM COMPUTER-READABLY STORING
PROGRAM THEREFOR

BACKGROUND

1. Field

The present invention relates to a person estimation device, a person estimation method, and a program.

2. Description of the Related Art

Conventionally, there has been known a technique of performing face recognition by registering recognition information for the face recognition in a database and checking it with a recognition target image. In Japanese Patent Application Laid-Open No. 2010-86549, there is disclosed a technique of selecting a person to be recognized first from a photographed image and selecting another object person based on an attribute of this person.

However, in the prior art, the person to be recognized first is selected from the photographed image, and the other object person is selected based on the attribute associated with this person, whereby in a case where first person estimation is not appropriate, accuracy of the person estimation of the other object person is also decreased.

SUMMARY

Aspects of the present invention include a classification unit configured to classify object-related information indicating a feature of an object into attributes; a generation unit configured to execute object recognition processing on an image and to generate feature information of a partial area of the image; a first calculation unit configured to calculate a degree of similarity between the object and the partial area based on the object-related information and the feature information; an estimation unit configured to estimate the object for each partial area based on the degree of similarity; a second calculation unit configured to calculate, for each attribute, a total the degrees of similarity between the object-related information classified into the attribute and the partial area for a combination of objects that has been estimated; a selection unit configured to select at least one of the combination of the objects that has been estimated based on the total; and a storage unit configured to store the object included in a combination that has been selected by associating it with the image.

Further features of the present disclosure will become apparent from the following description of exemplary embodiments with reference to the attached drawings

DESCRIPTION OF THE EMBODIMENTS

Exemplary embodiments are described below based on the drawings.

(First Embodiment)

Figure 1:
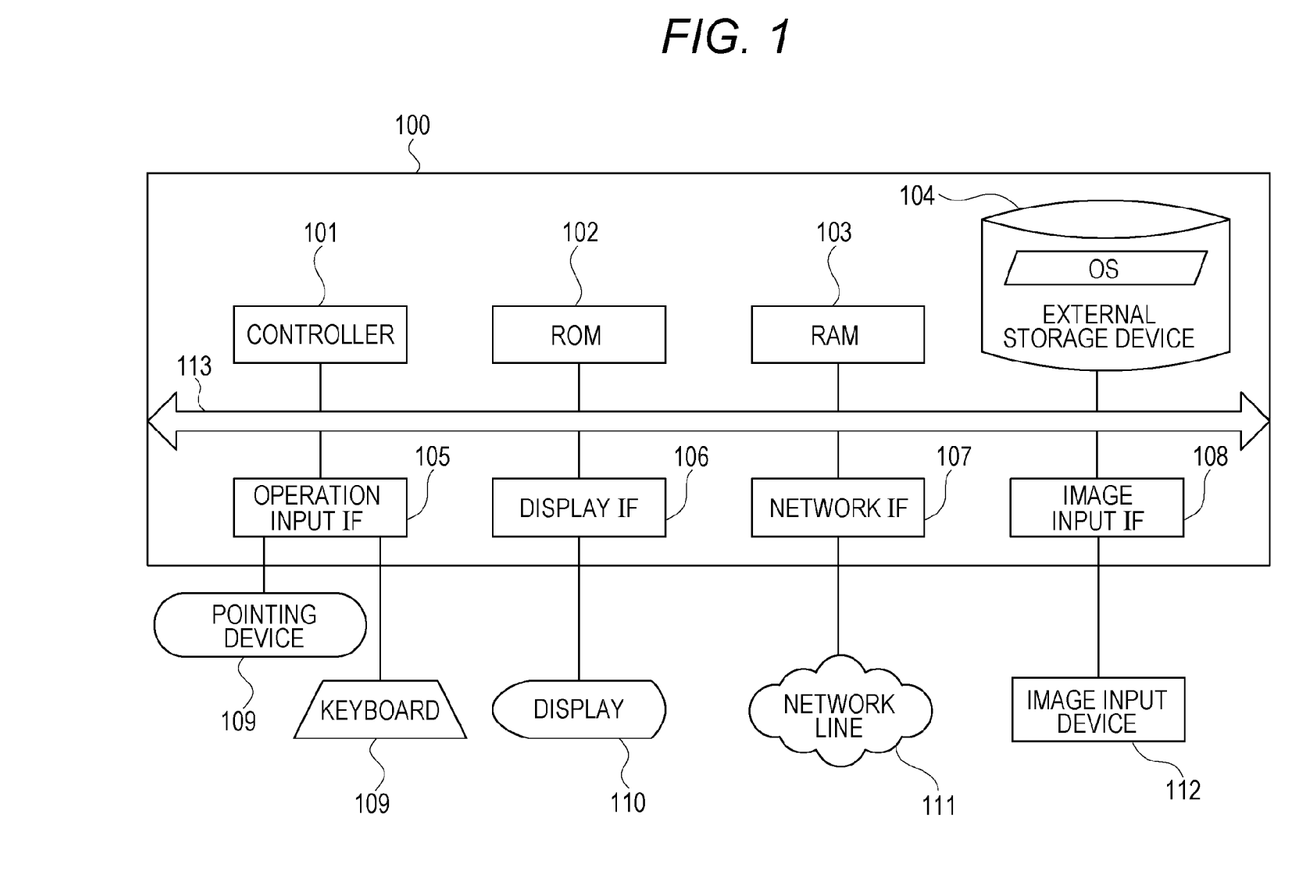
FIG. 1 is a view illustrating a person estimation device.

FIG. 1 is a view illustrating a person estimation device according to the present exemplary embodiment. The person estimation device performs person estimation by using face feature information, extracted from a photographed image including a plurality of object persons, as recognition information. Here, the face feature information is data indicating a facial feature(s) of a person. By comparing the face feature information extracted from the photographed image with face feature information registered in advance, the person estimation device calculates a score, which is a degree of similarity between the object person and a registered person. Then, the person estimation device accumulates the scores based on an attribute of each of the object persons and performs the person estimation based on the accumulated score. Accordingly, it is possible to correctly estimate each of the object persons in an image including an object person of whom person estimation cannot be appropriately performed alone.

In FIG. 1, a controller 101 controls an entire computer device realizing a person estimation device 100, and is, for example, a central processing unit (CPU). A read only memory (ROM) 102 stores a program and a parameter requiring no change. A random access memory (RAM) 103 temporarily stores a program and data supplied from an external device and the like. An external storage device 104, such as a hard disk or a memory card, is fixedly installed in the person estimation device. The external storage device 104 may also be a flexible disk (FD), an optical disc such as a compact disc (CD), a magnetic card, an optical card, an IC card, or the like that is attachable to and detachable from the person estimation device 100.

An interface 105 receives data from an input device 109, such as a pointing device or a keyboard. An interface 106 is connected with a display 110 that displays data held by the person estimation device 100, as well as supplied data. A network interface 107 is connected to a network line 111, such as the Internet. An image input interface 108 receives image data to be processed from an image input device 112, such as an image capturing device. A system bus 113 communicably connects each of the units from 101 to 108.

A function and processing of the person estimation device 100 described below is realized by the controller 101 reading a program, which is stored in the ROM 102 or the external storage device 104, and executing this program.

Figure 2:
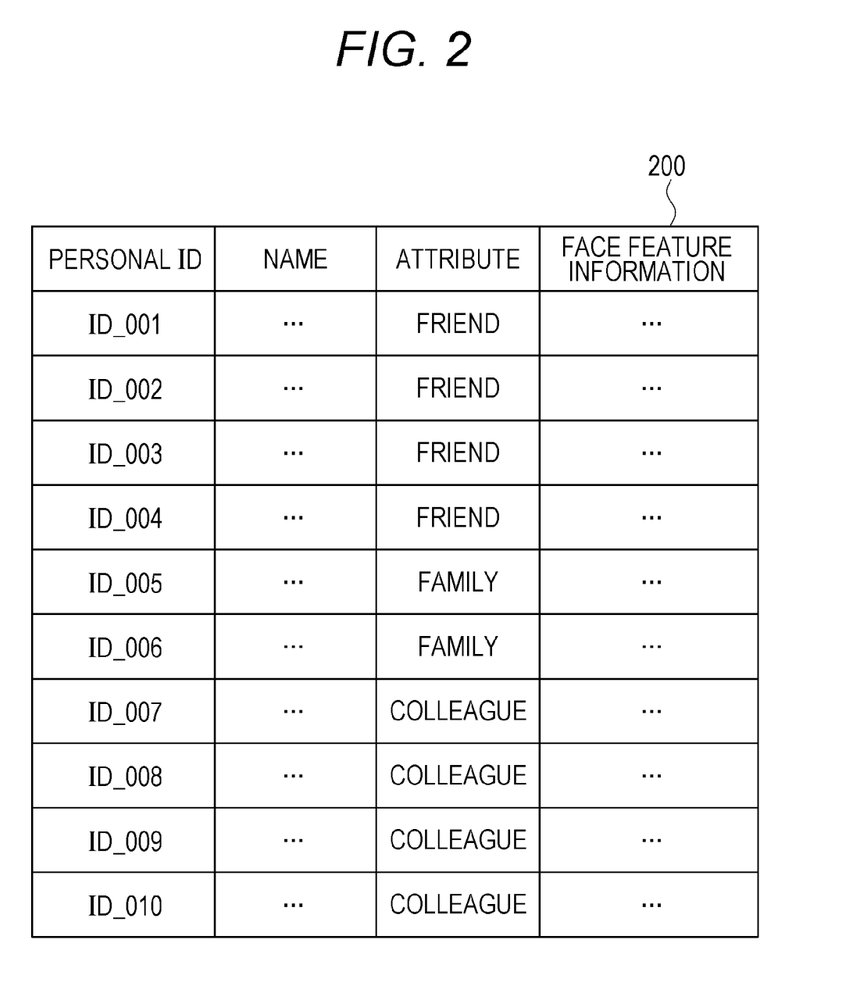
FIG. 2 is a view illustrating a registered person table.

FIG. 2 is a view illustrating a registered person table. A registered person table 200 is stored, for example, in the external storage device 104. The registered person table 200 stores a personal ID, which is identification information of the registered person, by associating it with a name of the person, an attribute, and the face feature information. Here, the attribute is information indicating relationship between a user and the registered person and is, for example, a relative, a friend, a colleague, and the like. A plurality of the object persons included in one photographed image is spending the same time at the same place, whereby it is highly possible that the object persons belong to the same attribute. As described above, the face feature information is the data indicating the face feature of the person. The face feature information is one example of face-related information related to a face of the person.

The registered person table 200 is constituted of information registered in advance by the user using the input device 109. When registering a new registered person to the registered person table 200, the user inputs the name of the person, the attribute, and face image data of the registered person. Receiving this input, the controller 101 generates the personal ID. The personal ID is an identifier that allows the person estimation device 100 to uniquely identify and manage the person. The controller 101 also generates the face feature information based on the face image data that has been input. Then, the controller 101 associates the name of the person, the attribute, and the face feature information with the personal ID and registers it to the registered person table 200.

Figure 3:
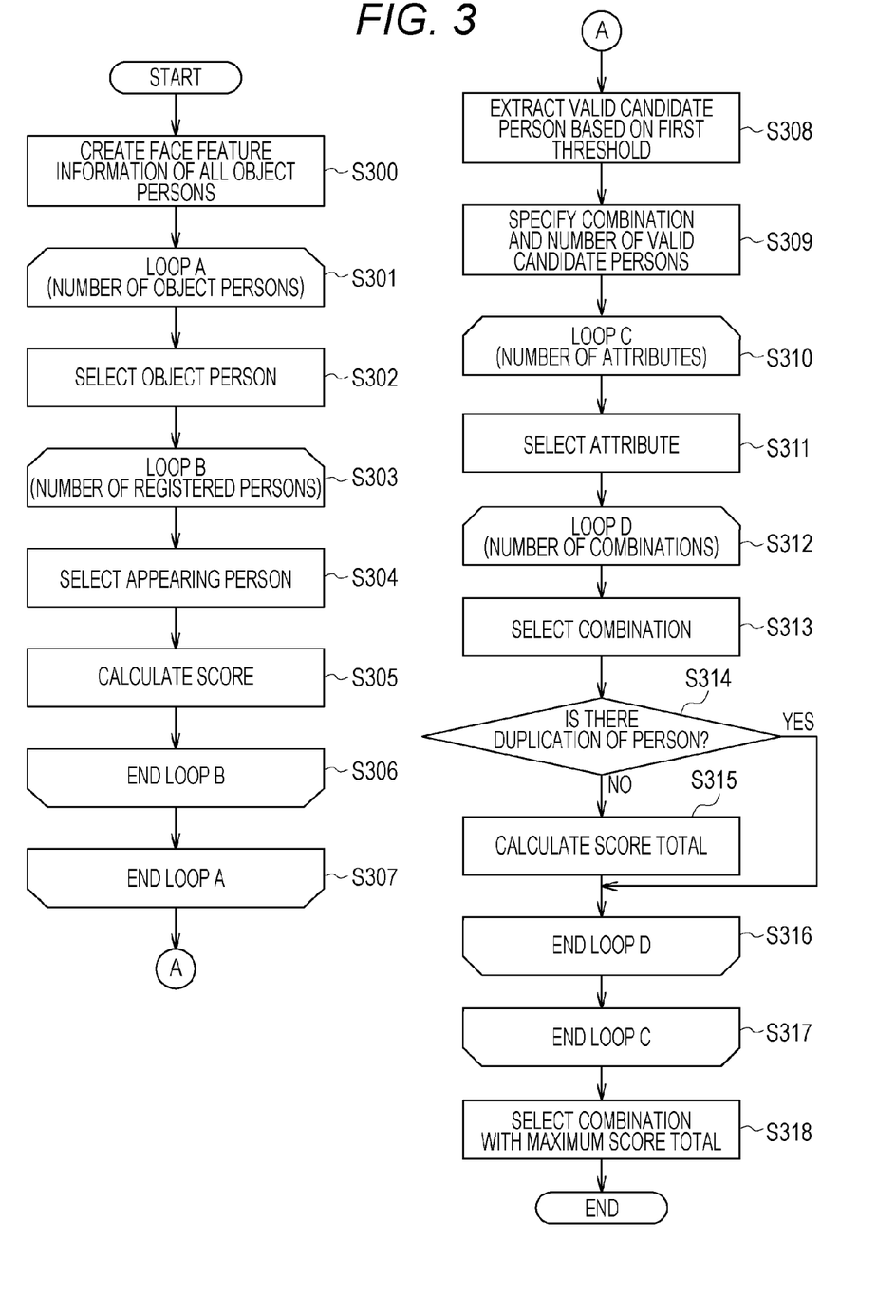
FIG. 3 is a flowchart illustrating person estimation processing.

FIG. 3 is a flowchart illustrating person estimation processing by the person estimation device 100. In S300, the controller 101 performs face recognition processing on the photographed image to be processed and extracts an image of all of the object persons included in the photographed image. Then, the controller 101 generates the face feature information from the image of each of the object persons. Data according to face recognition algorithm that is used is generated as the face feature information. For example, in a case where a relative position and a size of a face part as well as a shape of an eye, a nose, cheekbones, and a chin are used as a feature, the face feature information is generated by extracting information related to the face part from a face image. It is also possible to create standardized data from many face images of the same person and compress the individual face image to only a difference with the standardized data, whereby data required for face recognition is generated as the face feature information.

Figure 4:
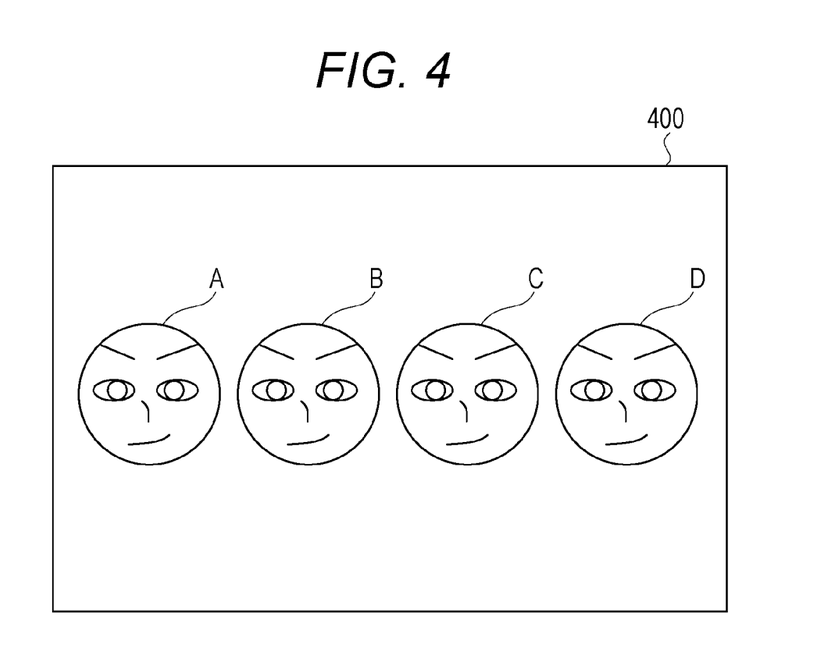
FIG. 4 is a view illustrating one example of a photographed image.

FIG. 4 is a view illustrating one example of the photographed image. In a photographed image 400 illustrated in FIG. 4, four object persons A to D are included. In this case, in S300, the controller 101 generates the face feature information for each of the object persons A to D, or four pieces of the face feature information.

Note that it is described here that the object persons A, B, C, and D are persons (registered persons) having personal IDs "ID_001", "ID_002", "ID_003", and "ID_004", respectively, that are registered in the registered person table. Note that the attribute of these four registered persons is "friend".

Back to FIG. 3, after the processing in S300, the controller 101 performs processing of a loop A from S301 to S307. The processing of the loop A is repeated as many as the number of the object persons included in the photographed image. In the photographed image illustrated in FIG. 4, the processing of the loop A is repeated four times. In S302, the controller 101 selects one unprocessed object person from the plurality of object persons extracted from the photographed image.

Subsequently, the controller 101 performs processing of a loop B from S303 to S306 on the object person being selected. The processing of the loop B is repeated as many as the number of the registered persons registered in the registered person table. In a case where the registered person table 200 illustrated in FIG. 2 is used, the processing of the loop B is repeated ten times. In S304, the controller 101 selects one unprocessed registered person from the registered persons registered in the registered person table 200 as a candidate person who is a candidate as a result of the person estimation.

Next, in S305, the controller 101 compares face feature information of the object person being selected with face feature information of the registered person being selected and, based on a comparison result, calculates a score for each of the object persons. Here, the score is a value indicating the degree of similarity between the object person to be processed and the candidate person to be processed. A higher score means a higher possibility that the object person is the candidate person.

The controller 101 ends the processing of the loop B when score calculation of the candidate person, in which all of the registered persons registered in the registered person table are set as the candidate person, is completed. Furthermore, the controller 101 ends the processing of the loop A when the processing of the loop B, in which all of the object persons in the photographed image are to be processed, is ended.

Figure 5:
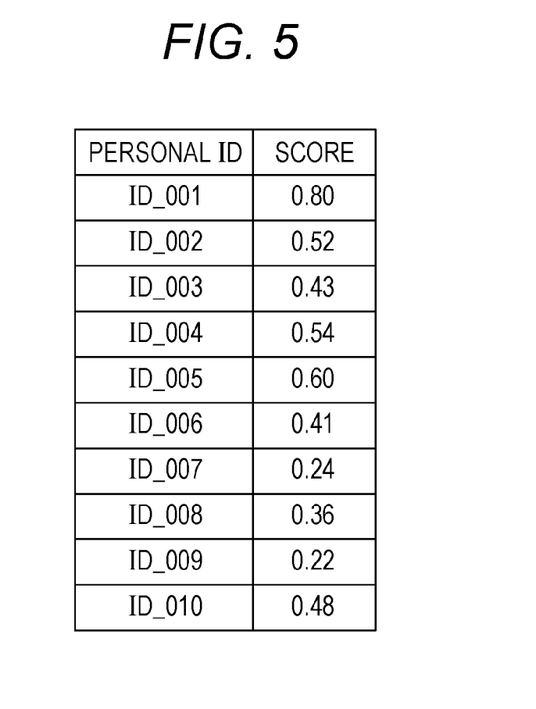
FIG. 5 is a table illustrating one example of a score of an estimated person.

FIG. 5 is a table illustrating one example of a score of each of the candidate persons calculated in comparison processing with an object person A illustrated in FIG. 4. In one processing of the loop A, it is possible to obtain a score of each of estimated persons when all of the registered persons registered in the registered person table are set as the estimated persons for one object person. In an example illustrated in FIG. 5, it can be said that the object person A is the most similar to a person having a personal ID "ID_001".

Four object persons are included in the photographed image illustrated in FIG. 4, whereby the loop A is repeated four times. For each of the four object persons, it is possible to obtain the score of each of the estimated persons when all of the registered persons registered in the registered person table are set as the estimated persons. That is, for each of the four object persons, it is possible to obtain a calculation result of the score as illustrated in FIG. 5.

Back to FIG. 3, after the processing in S307, the controller 101 advances the processing to S308. In S308, the controller 101 compares each of the scores of all of the candidate persons obtained for each of the object persons with a first threshold and extracts the candidate person corresponding to a score equal to or greater than the first threshold as a valid candidate person. Here, the first threshold is set, for example, in the external storage device 104 and the like in advance, and the first threshold is "0.6" in this embodiment.

Figure 6:
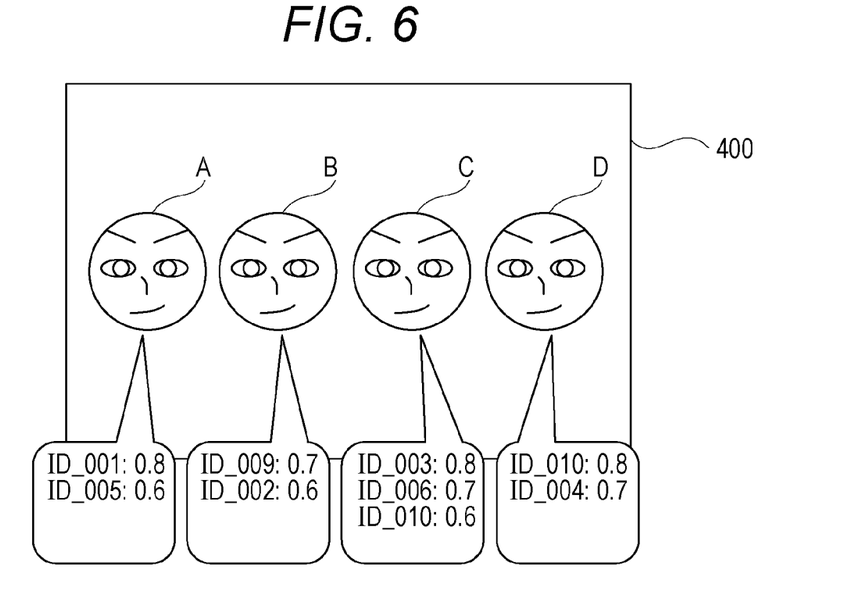
FIG. 6 is a view illustrating one example of a score of an estimated person.

In this case, among the candidate persons for the object person A illustrated in FIG. 5, only two persons having the personal IDs "ID_001" and "ID_005", respectively, are extracted as the valid candidate person. The controller 101 extracts the valid candidate person for all of the object persons included in the photographed image. FIG. 6 is a view illustrating the personal ID and the score of the valid candidate person obtained in the photographed image 400 illustrated in FIG. 4.

Next, in S309, the controller 101 specifies a combination and the number of the valid candidate persons corresponding to each of the plurality of object persons included in the photographed image. Since the valid candidate person is extracted for each of the object persons, it is possible to consider the combination of the valid candidate persons corresponding to the plurality of object persons included in the photographed image as many as a product of the numbers of the valid candidate persons for each of the object persons.

In an example illustrated in FIG. 6, the number of the valid candidate persons for the object persons A to D is "2", "2", "3", and "2", respectively. Therefore, the product of these numbers, or "24", is calculated as the number of the combinations of the valid candidate persons.

Next, the controller 101 performs processing of a loop C from S310 to 317. The processing of the loop C is repeated as many as the number of the attributes set in advance. In this embodiment, three attributes are set, whereby the processing of the loop C is repeated three times. In S311, the controller 101 selects one unprocessed attribute from a plurality of attributes set in advance.

Subsequently, the controller 101 performs processing of a loop D from S312 to S316 on the attribute being selected. The processing of the loop D is repeated as many as the number of the combinations that has been calculated in S309. As described above, in a case where 24 is calculated as the number of the combinations, the processing of the loop D is repeated 24 times.

In S313, the controller 101 selects one unprocessed combination from the combinations in the number that has been calculated in S309. Next, in S314, the controller 101 checks whether or not there is duplication of a person in the combination being selected, that is, whether or not the same registered person is included in the combination. In a case where there is no duplication of the person (no in S314), the controller 101 advances the processing to S315. In S315, the controller 101 calculates a total value of the scores (score total) of the valid candidate persons for the attribute being selected included in the combination and ends the processing of the loop D. That is, the processing in S315 is one example of total value calculation processing in which the total value of the scores is calculated for each of the attributes.

Note that in S315, among each of the valid candidate persons included in the combination, the controller 101 sets, as a target of total value calculation, only the scores of the valid candidate persons who have the attribute coinciding with the attribute being selected. On the other hand, the controller 101 does not set, as the target of the total value calculation, the score of the valid candidate person who has the attribute not coinciding with the attribute being selected.

In a case where there is duplication of the person (yes in S314), the controller 101 ends the processing of the loop D without performing the processing in S315. It is not possible that more than one person who is the same exists in the photographed image. That is, a combination in which there is the duplication of the person cannot be an estimation result. Therefore, in this case, calculation processing of the score total is not performed. By the above processing, the score total is calculated for each of the attributes and for each of the combinations of the valid candidate persons.

For example, the score total is calculated for a combination in which four valid candidate persons having personal IDs "ID_001", "ID_002", "ID_003", and "ID_010", respectively, are allocated to each of the object persons A, B, C, and D illustrated in FIG. 4. Here, the attribute being selected, or the attribute to be processed, is "friend".

Figure 7:
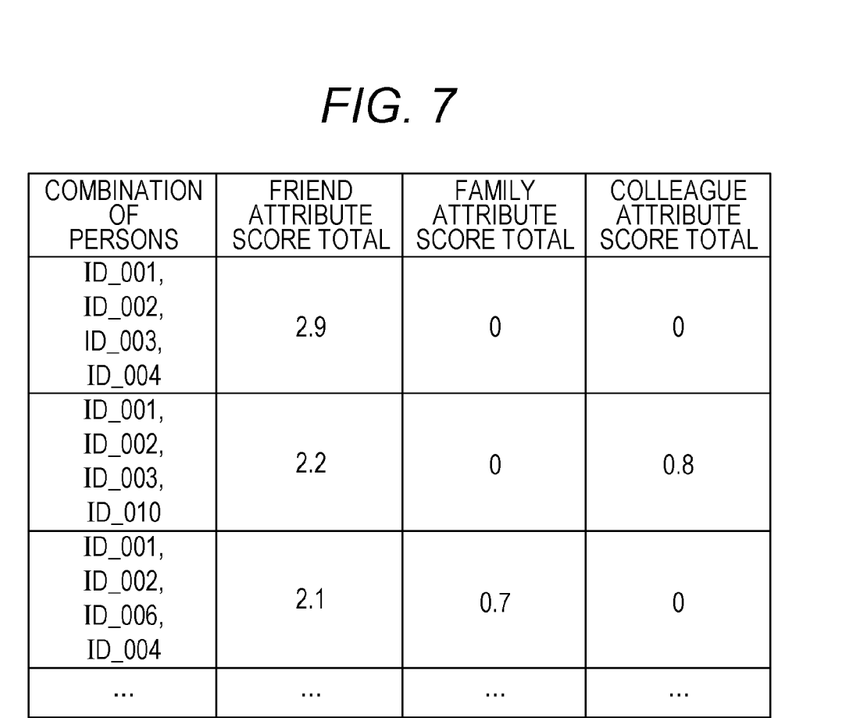
FIG. 7 is a table illustrating one example of a score total.

In this case, a target of total calculation is three persons having the personal IDs "ID_001", "ID_002", and "ID_003" in which the attribute is "friend". The scores of these persons are "0.8", "0.6", and "0.8", respectively. Therefore, a value "2.2", which is the value obtained by adding three scores, is the score total. FIG. 7 is a table illustrating one example of the score total of each of the attributes calculated for each of the combinations of the valid candidate persons illustrated in FIG. 6.

After the processing of the loop C, the controller 101 advances the processing to S318. In S318, among the combinations in the number that has been calculated in S309, the controller 101 selects the combination having the maximum score total as the estimation result. Here, the processing in S318 is one example of the person estimation processing in which it is estimated whether or not each of the combinations corresponds to the plurality of object persons based on the attribute and the score.

In the example illustrated in FIG. 7, "2.9" is a maximum value. Then, a corresponding combination, or the combination in which the registered persons having personal IDs "ID_001", "ID_002", "ID_003", and "ID_004" are allocated to the object persons A, B, C, and D, respectively, is selected as the estimation result. For example, the estimated personal ID is stored in association with the photographed image 400. Here, furthermore, the personal ID may be stored in association with coordinate information indicating a region of each of the persons in the photographed image 400. Still furthermore, when displaying the photographed image 400 on a screen, the estimated personal ID or a name may be displayed near each of the persons in the photographed image.

Note that there has been described a case where only the combination having the score that is the maximum value is selected; however, it is also possible to select more than one combination having a high score. Then, a plurality of estimation results may be displayed on the screen, and one optimal combination may be selected by user operation.

In this way, the person estimation device 100 according to this embodiment performs the person estimation by using the combination of a plurality of valid candidate persons allocated to the plurality of object persons, respectively, included in the photographed image as a unit. Accordingly, it is possible to estimate each of the object persons with high accuracy.

For example, in the example illustrated in FIG. 6, it is possible to determine the candidate person having the highest score as the estimation result for each of the object persons. In this case, for the object persons A to D, the candidate persons having personal IDs "ID_001", "ID_009", "ID_003", and "ID_010", respectively, are obtained as the estimation result. That is, a correct estimation result is not obtained for the object persons B and D. In contrast, as described above, the person estimation device 100 according to this embodiment is capable of correctly estimating all of the object persons A to D in the example illustrated in FIG. 6.

Note that as a first modification of the person estimation device 100 according to the first embodiment, a face image itself may be stored as the face-related information in place of the face feature information in the registered person table 200. In this case, the controller 101 may calculate the score by comparing the face image stored in the registered person table 200 with the face image extracted from the photographed image or may compare face feature amounts by extracting the face feature amount from both of the images.

As a second modification, the image to be processed by the person estimation device 100 is not to be limited to a photographed image and may also be a preview image displayed on a preview screen of a photographic device before photographing.

(Second Embodiment)

Figure 8:
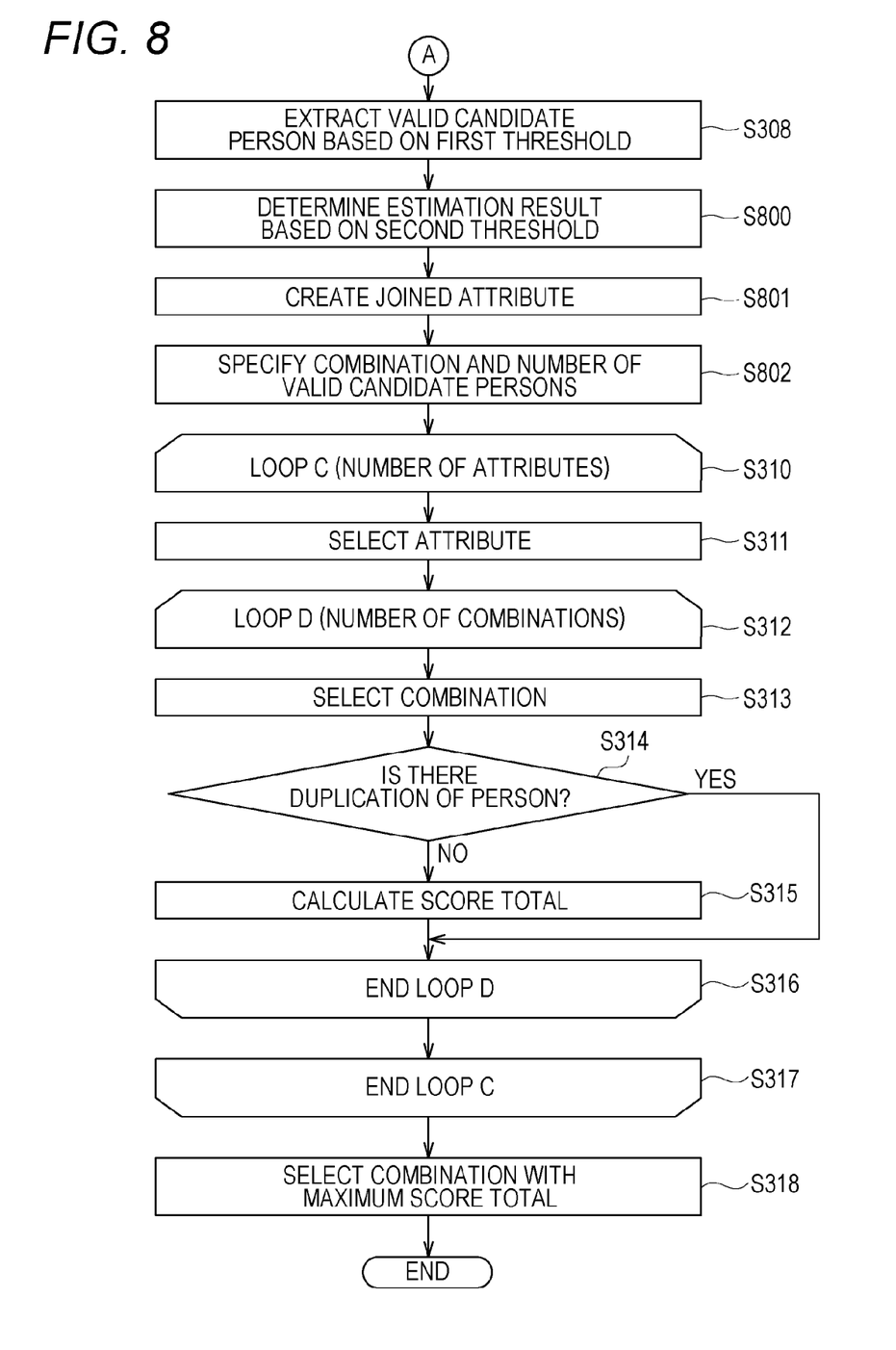
FIG. 8 is a flowchart illustrating person estimation processing according to a second embodiment.

A person estimation device 100 according to a second embodiment joins as appropriate attributes set in advance, newly creates a joined attribute, and performs person estimation based on the joined attribute. FIG. 8 is a flowchart illustrating person estimation processing by the person estimation device 100 according to the second embodiment. Note that the processing illustrated in FIG. 8 is the processing subsequent to processing from S300 to S307 illustrated in FIG. 3.

Figure 9:
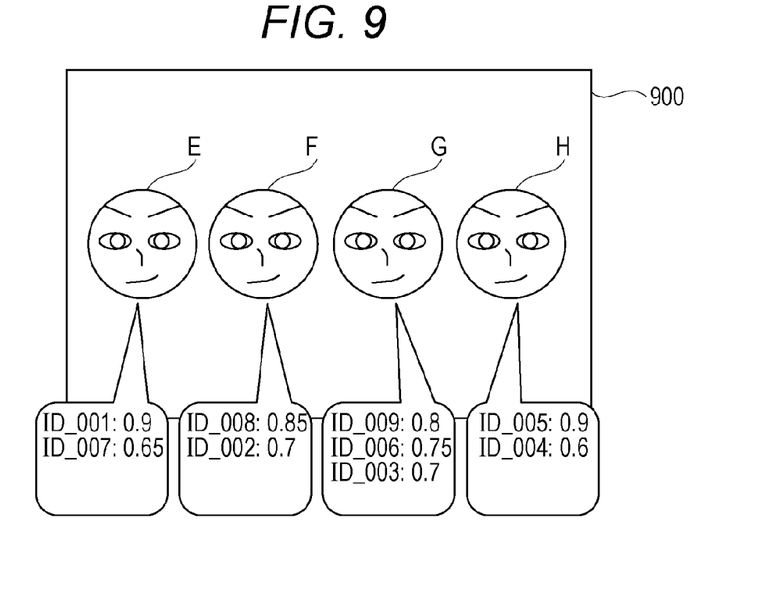
FIG. 9 is a view illustrating one example of a score of an estimated person.

FIG. 9 is a view illustrating a photographed image 900, a personal ID of a valid candidate person obtained for the photographed image 900, and a score thereof. Here, object persons E, F, G, and H illustrated in the photographed image 900 are registered persons having personal IDs "ID_001", "ID_002", "ID_006", and "ID_005", respectively. The attribute of the registered persons having the personal IDs "ID_001" and "ID_002" is "friend", and the attribute of the registered persons having the personal IDs "ID_006" and "ID_005" is "family". That is, the photographed image 900 is a group photograph of friends and a family. Here, the person estimation processing according to the second embodiment is described taking the photographed image 900 as an example.

Back to FIG. 8, after the processing in S308, a controller 101 advances the processing to S800. In S800, based on a second threshold, the controller 101 determines an estimation result of a part of object persons among the plurality of object persons included in a photographed image. Specifically, in a case where a maximum value of the score of the valid candidate person calculated for each of the object persons is equal to or greater than the second threshold, the controller 101 determines the estimation result of the object person that this object person is the valid candidate person for which a maximum score has been calculated. Note that the second threshold is a value greater than a first threshold and is set in advance, for example, in an external storage device 104 and the like.

In this embodiment, the second threshold is "0.9", and in an example illustrated in FIG. 9, the estimation result is determined that the object persons E and H are the registered persons having the personal IDs "ID_001" and "ID_005", respectively.

Next, in S801, based on the estimation result that has been determined, the controller 101 creates the joined attribute. Specifically, in a case where the attribute of the registered person, who has been determined as the estimation result, is different for each of two or more object persons, the controller 101 newly creates the joined attribute by joining these attributes.

In the example illustrated in FIG. 9, the estimation result has been determined that the object persons E and H are the registered persons having the personal IDs "ID_001" and "ID_005", respectively. Also, the attribute of the registered persons having the personal IDs "ID_001" and "ID_005" is the "friend" and the "family", respectively. Therefore, in this case, the controller 101 creates a joined attribute of two attributes of the "friend" and the "family".

Next, in S802, the controller 101 specifies a combination and the number of the valid candidate persons for an undetermined object person. For example, in the example in FIG. 9, two persons F and G are the undetermined object persons, and the number of valid candidate persons extracted for each of them is "2" and "3", respectively.

Therefore, a product of these numbers, or "6", is calculated as the number of the combinations. Subsequently, the controller 101 advances the processing to S310. Note that the processing in S310 and after is similar to the processing in the first embodiment.

Note that in the processing of the loop C, the controller 101 performs the processing on the joined attribute as one of the attributes. Then, in a case where the joined attribute is a processing target, the controller 101 sets the score of the valid candidate person belonging to any of joining source attributes as a target of total calculation. On the other hand, the controller 101 does not perform calculation of the score total on the individual joining source attribute.

Figure 10:
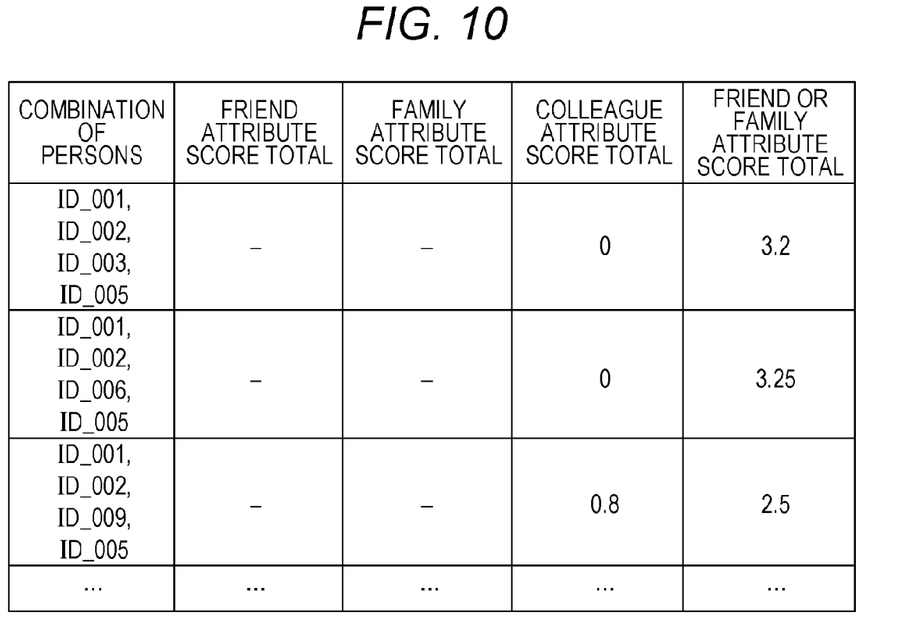
FIG. 10 is a table illustrating one example of a score total of each of attributes.

FIG. 10 is a table illustrating one example of the score total for each of the attributes calculated for the combination of the valid candidate persons illustrated in FIG. 9. As illustrated in FIG. 10, the joined attribute of the "friend or family" is created, and a score total for this joined attribute is calculated. On the other hand, calculation of the score total is not performed on each of the individual attributes of the "friend" or the "family", which are the joining source attributes of the joined attribute of the "friend or family".

In the example illustrated in FIG. 10, "3.25" calculated for the joined attribute of the "friend or family" is the maximum score. Therefore, in S318, a combination corresponding to "3.25" is selected as the estimation result. Here, the corresponding combination is a combination in which the registered persons having the personal IDs "ID_001", "ID_002", "ID_006", and "ID_005" are allocated to object persons E, F, G, and H, respectively.

Note that when person estimation is performed individually based on the score of the object person, a combination in which the registered persons having personal IDs "ID_001", "ID_008", "ID_009", and "ID_005" are allocated to the object persons E, F, G, and H, respectively, is identified as the estimation result. That is, the correct person estimation is not performed on the object persons F and G. In contrast, the person estimation device 100 according to this embodiment is capable of correctly performing the person estimation also on the object persons F and G.

Note that a configuration and processing of the person estimation device 100 according to the second embodiment other than this is similar to the configuration and the processing of the person estimation device 100 according to the first embodiment.

(Third Embodiment)

A person estimation device 100 according to a third embodiment performs person estimation based on a priority attribute set by a user. That is, the person estimation device 100 according to this embodiment makes a setting of the priority attribute according to user operation prior to person estimation processing. Specifically, the user performs input of attribute specification information, which specifies a desired attribute as the priority attribute, by using an input device 109. Then, when a controller 101 receives the input of the attribute specification information, it sets the specified attribute as the priority attribute based on the attribute specification information.

Figure 11:
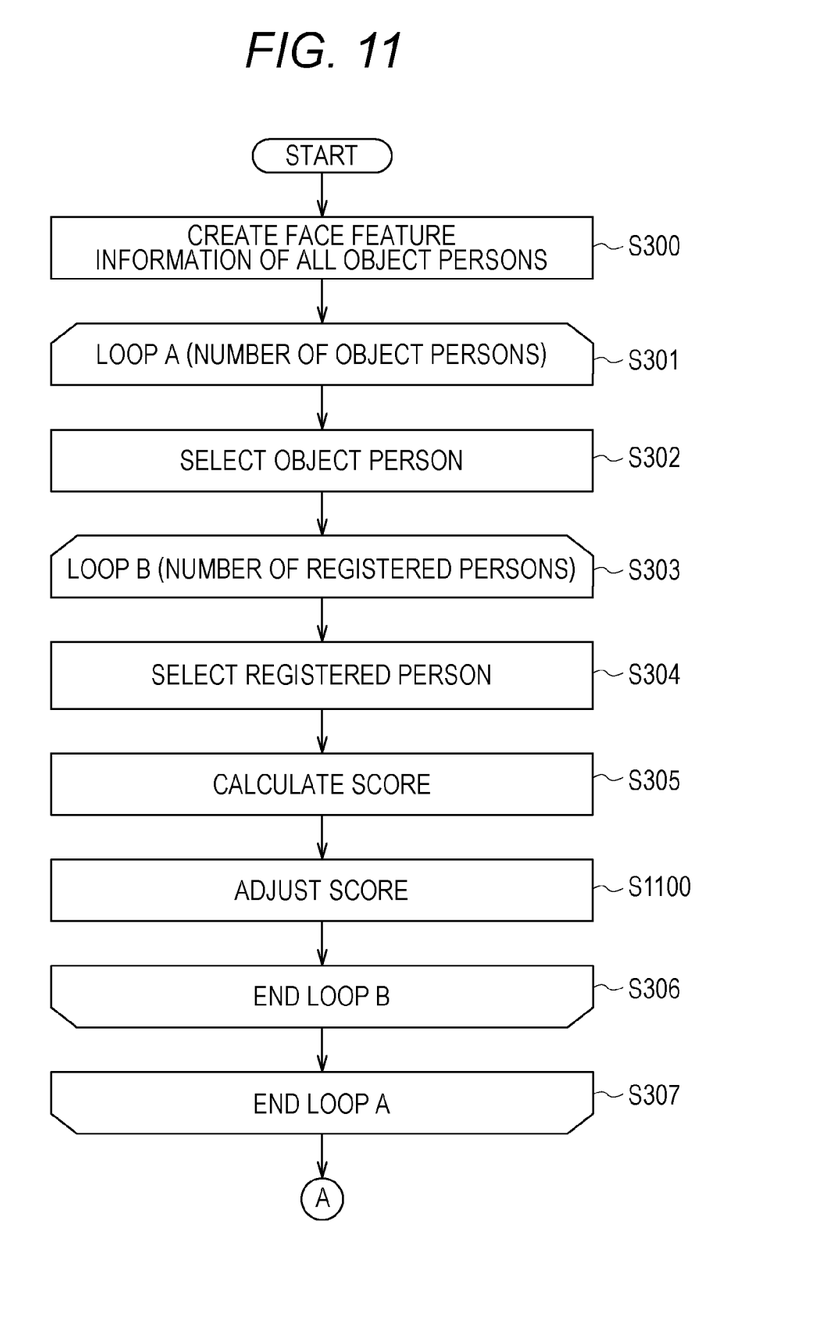
FIG. 11 is a flowchart illustrating person estimation processing according to a third embodiment.

FIG. 11 is a flowchart illustrating the person estimation processing by the person estimation device 100 according to the third embodiment. After the processing in S305, the controller 101 of the person estimation device 100 according to the third embodiment advances the processing to S1100. In S1100, the controller 101 adjusts the score that has been calculated in S305. Specifically, the controller 101 multiplies the score of a candidate person associated with the priority attribute by a fixed value set in advance.

For example, in a case where it is known in advance that there are many images of friends in a photographed image to be processed, the user sets a friend attribute to the priority attribute in the person estimation device 100. Accordingly, the person estimation device 100 adjusts the score associated with the friend attribute, whereby it is capable of performing the person estimation according to the adjusted score. In this way, by referencing the priority attribute set by the user, the person estimation device 100 is capable of performing the person estimation more accurately.

Note that a configuration and processing of the person estimation device 100 according to the third embodiment other than this is similar to the configuration and the processing of the person estimation device 100 of other embodiments.

As above, according to each of the above-described embodiments, it is possible to estimate a person with high accuracy.

Note that in each of the above-described embodiments, a person has been used as an example of a target of image recognition in the descriptions. In other embodiments, other entities can be used in place of a person as the target.

Other Embodiments

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-118739, filed Jun. 9, 2014, which is hereby incorporated by reference herein in its entirety.

What is claimed is:

1. an image processing device comprising circuitry configured as:
   a classification unit configured to classify object-related information, which indicates a feature of an object, as coinciding with an attribute of one or more attributes, wherein each attribute of the one or more attributes defines a respective relationship between a first object and a second object;
   a generation unit configured to generate respective feature information of one or more partial areas of an image by executing object recognition processing on the one or more partial areas of the image;
   a first calculation unit configured to calculate respective degrees of similarity between the object and the one or more partial areas based on the object-related information and the respective feature information;
   an estimation unit configured to estimate a respective at least one particular object for each of the one or more partial areas based on the respective degrees of similarity between the one or more partial areas and the respective at least one particular object;
   a second calculation unit configured to calculate, for each attribute, respective totals of the degrees of similarity of estimated particular objects coinciding with the attribute for each combination of the estimated particular objects assigned to partial areas in the image, wherein the degrees of similarity of the estimated particular objects not coinciding with the attribute are not included in the respective total for the attribute;
   a selection unit configured to select at least one of the combinations of the estimated particular objects based on the calculated totals; and
   a storage unit configured to store information of the particular objects included in the selected combination in association with the image.

2. The image processing device according to claim 1, wherein the classification unit classifies the object-related information as coinciding with the attribute in response to user operation.

3. The image processing device according to claim 1, the second calculation unit calculates the respective totals of the degrees of similarity by weighting each of the attributes.

4. The image processing device according to claim 1, wherein the storage unit stores information of the particular object included in the selected combination in association with coordinate information indicating the partial area of the image.

5. The image processing device according to claim 1, wherein the second calculation unit does not perform calculation on a combination in which the same particular object is included.

6. An image processing method comprising: Implemented one or more processors in a following steps;
   classifying, with one or more processors, object-related information, which indicates a feature of an object, as coinciding with an attribute of one or more attributes, wherein each attribute of the one or more attributes defines a respective relationship between a first object and a second object;
   generating, with one or more processors, respective feature information of one or more partial areas of an image by executing object recognition processing on the one or more partial areas of the image;
   calculating, with one or more processors, a respective degree of similarity between each object of one or more objects and each partial area of the one or more partial areas based on the object-related information and the feature information;
   estimating, with one or more processors, at least one particular object of the one or more objects for each partial area based on the respective degree of similarity;
   calculating, with one or more processors, for each attribute of the one or more attributes, respective totals of the degrees of similarity corresponding to estimated particular objects coinciding with the attribute for each combination of the estimated particular objects assigned to the partial areas in the image, wherein the degrees of similarity of the estimated particular objects not coinciding with the attribute are not included in the respective total for the attribute;
   selecting, with one or more processors, at least one of the combinations of the estimated particular objects based on the calculated totals; and
   storing information of the particular objects included in the selected combination in association with the image.

7. A non-transitory computer readable storage medium storing computer executable instructions for causing a computer to execute an image processing method, the image processing method comprising:
   classifying object-related information, which indicates a feature of an object, as coinciding with an attribute of one or more attributes, wherein each attribute of the one or more attributes defines a respective relationship between a first object and a second object;
   generating respective feature information of one or more partial areas of an image by executing object recognition processing on the one or more partial areas of the image;

calculating a respective degree of similarity between each object of one or more objects and each partial area of the one or more partial areas based on the object-related information and the feature information;

estimating at least one particular object of the one or more objects for each partial area based on the respective degree of similarity;

calculating, for each attribute of the one or more attributes, respective totals of the degrees of similarity corresponding to estimated particular objects coinciding with the attribute for each combination of the estimated particular objects assigned to the partial areas in the image, wherein the degrees of similarity of the estimated particular objects not coinciding with the attribute are not included in the respective total for the attribute;

selecting at least one of the combinations of the estimated particular objects based on the calculated totals; and storing information of the particular objects included in the selected combination in association with the image.

8. The image processing device according to claim 1, wherein the object is a person and the attribute indicates as relationship among people.

9. The image processing device according to claim 1, wherein the selection unit selects the combination whose total of the degrees of similarity is largest among the combinations.

* * * * *